(12) United States Patent
Ohta et al.

(10) Patent No.: US 11,822,905 B2
(45) Date of Patent: Nov. 21, 2023

(54) INTERACTIVE SERVICE PROVIDING SYSTEM, INTERACTIVE SERVICE PROVIDING METHOD, SCENARIO GENERATION AND EDITING SYSTEM, AND SCENARIO GENERATION AND EDITING METHOD

(71) Applicant: KUZEN Inc., Tokyo (JP)

(72) Inventors: Shogo Ohta, Tokyo (JP); Kota Shirakura, Tokyo (JP)

(73) Assignee: KUZEN INC., Tokyo (JP)

( * ) Notice: Subject to any disclaimer, the term of this patent is extended or adjusted under 35 U.S.C. 154(b) by 236 days.

(21) Appl. No.: 17/420,049

(22) PCT Filed: Dec. 31, 2019

(86) PCT No.: PCT/JP2019/051643
§ 371 (c)(1),
(2) Date: Jun. 30, 2021

(87) PCT Pub. No.: WO2020/141611
PCT Pub. Date: Jul. 9, 2020

(65) Prior Publication Data
US 2022/0083317 A1    Mar. 17, 2022

(30) Foreign Application Priority Data
Dec. 31, 2018   (JP) ................. 2018-248814

(51) Int. Cl.
*G06F 8/34*         (2018.01)
*G06F 40/166*    (2020.01)
*G06F 40/20*      (2020.01)

(52) U.S. Cl.
CPC .............. *G06F 8/34* (2013.01); *G06F 40/166* (2020.01); *G06F 40/20* (2020.01)

(58) Field of Classification Search
None
See application file for complete search history.

(56) References Cited

U.S. PATENT DOCUMENTS

2018/0129484 A1*  5/2018  Kannan ............... G06F 3/04847

FOREIGN PATENT DOCUMENTS

| JP | H1069379 A | 3/1998 |
| JP | 201832330 A | 3/2018 |
| JP | 2018032330 A * | 3/2018 |

* cited by examiner

*Primary Examiner* — Isaac Tuku Tecklu
(74) *Attorney, Agent, or Firm* — IP BUSINESS SOLUTIONS, LLC

(57) ABSTRACT

A server executes various controls for teams, each of which has at least one player, to have a matchup with each other, and manages each team, including change of a team during the game, record of each team, players and a number of players belonging to each team, and duration of a team. Further, the server determines, during the matchup game, whether a team item acquisition condition is satisfied based on the record of each player who belongs to the team and the like, and allows the team that satisfies the team item acquisition condition to acquire a team item which provides an advantageous effect in the game.

11 Claims, 10 Drawing Sheets

INTERACTIVE SERVICE PROVIDING SYSTEM, INTERACTIVE SERVICE PROVIDING METHOD, SCENARIO GENERATION AND EDITING SYSTEM, AND SCENARIO GENERATION AND EDITING METHOD

TECHNICAL FIELD

The present invention relates to an interactive service providing system, an interactive service provision method, a scenario generating and editing system, and a scenario generation and editing method.

BACKGROUND OF THE INVENTION

In recent years, services such as chat applications have been proposed that use robots called chatbots having the know-how of experts with a wealth of knowledge to answer inquiries from users based on interactive scenarios.

For example, systems that provide chatbot is controlled by scripts using programming languages, scripting languages, and the like.

In order to generate such scripts, for example, there are known methods such as hard coding, which is written directly in a programming language or scripting language, and codeless coding, which uses GUI (Graphical User Interface) to arrange icons.

However, in the case of conventional systems for providing chatbots, when there are a large number of scenarios and many branches, it is difficult to check the logs and display the entire scenario in a simple manner, and it is also difficult to change the scenario in a simple manner. There are various systems to solve these problems.

In particular, recently, in order to visualize increasingly complex scenarios, it is known that the system guides the user to some extent when generating the scenario (for example, Non-patent Document 1).

PRIOR ART DOCUMENTS

Non-Patent Documents

[Non-patent Document 1] Official website for developing chabots using Watson Conversation Service [retrieved in Nov. 30, 2018] (URL: https://www.ibm.com/watson/jp-ja/how-to-build-a-chabot/)

SUMMARY OF INVENTION

Technical Problem

In a system that responds to a user's request based on a scenario such as the Non-patent Document 1, although the administrator can easily generate the scenario, flexibility for the administrator is limited, and the function to support the administrator in generating or editing the scenario may be insufficient.

The present invention is made in order to solve the above-described problem, and an object thereof is to provide an interactive service providing system, and the like, that can reduce the administrator's effort during scenario generation and editing, and enable intuitive operation by reducing restrictions during generation and editing, thereby improving the administrator's convenience.

Solution to Problem

In order to solve the above-described problem, the interactive service providing system according to a first aspect of the present invention that performs a service desired by a user based on scenario data that is a digitized scenario and that defines responses corresponding to a given input text by analyzing the input text, includes:
  a reception processor that receives instructions from an administrator who manages the scenario data;
  a scenario generator that generates or edits the scenario data by combining scenario component data that defines a predetermined script to configure the scenario data based on the received administrator's instructions;
  an object arrangement and connection controller, when generating or editing the scenario data, based on the accepted administrator's instructions, (A) that arranges a plurality of the scenario component data in an object space as objects, and (B) that controls connection and disconnection of two or more scenario component data arranged in the object space;
  a determination processor that, when the two or more of the scenario component data are connected in the object space, performs a determination process that determines whether the group of scenario component data works properly or fails to work properly as at least a part of the scenario, the group of scenario component data having the two or more of the scenario component data; and
  a display controller that executes a display control process imaging the object space including the arranged scenario component data on a display, and displaying the result of the determination process on the display.

The interactive service providing method according to a second aspect of the present invention that performs a service desired by a user based on scenario data that is a digitized scenario and that defines responses corresponding to a given input text by analyzing the input text, includes:
  receiving instructions from an administrator who manages the scenario data;
  generating or edits the scenario data by combining scenario component data that defines a predetermined script to configure the scenario data based on the received administrator's instructions;
  when generating or editing the scenario data, based on the accepted administrator's instructions, (A) arranging a plurality of the scenario component data in an object space as objects, and (B) controlling connection and disconnection of two or more scenario component data arranged in the object space;
  when the two or more of the scenario component data are connected in the object space, performing a determination process that determines whether the group of scenario component data works properly or fails to work properly as at least a part of the scenario, the group of scenario component data having the two or more of the scenario component data; and
  executing a display control process that images the object space including the arranged scenario component data on a display, and that displays the result of the determination process on the display.

The scenario generating and editing system according to a third aspect of the present invention that generates and edits scenario data that is used in an interactive service providing system performing a service desired by a user based on scenario data that is digitized a scenario that defines responses corresponding to a given input text by analyzing the input text, includes:
  a reception processor that receives instructions from an administrator who manages the scenario data;

a scenario generator that generates or edits the scenario data by combining scenario component data that defines a predetermined script to configure the scenario data based on the received administrator's instructions;

a object arrangement and connection controller, when generating or editing the scenario data, based on the accepted administrator's instructions, (A) that arranges a plurality of the scenario component data in an object space as objects, and (B) that controls connection and disconnection of two or more scenario component data arranged in the object space;

a determination processor that, when the two or more of the scenario component data are connected in the object space, performs a determination process that determines whether the group of scenario component data works properly or fails to work properly as at least a part of the scenario, the group of scenario component data having the two or more of the scenario component data; and a display controller that performs a displaying control process which images the object space including the arranged scenario component data on a display, and which displays the result of the determination process on the display.

The scenario generating and editing method according to a fourth aspect of the present invention that generates and edits scenario data that is used in an interactive service providing system performing a service desired by a user based on scenario data that a scenario is digitized, the scenario defining responses corresponding to a given input text by analyzing the input text, includes:

receiving instructions from an administrator who manages the scenario data;

generating or edits the scenario data by combining scenario component data that defines a predetermined script to configure the scenario data based on the received administrator's instructions;

when generating or editing the scenario data, based on the accepted administrator's instructions, (A) arranging a plurality of the scenario component data in an object space as objects, and (B) controlling connection and disconnection of two or more scenario component data arranged in the object space;

when the two or more of the scenario component data are connected in the object space, performing a determination process that determines whether the group of scenario component data works properly or fails to work properly as at least a part of the scenario, the group of scenario component data having the two or more of the scenario component data; and executing a display control process that images the object space including the arranged scenario component data on a display, and that displays the result of the determination process on the display.

Figure 1:
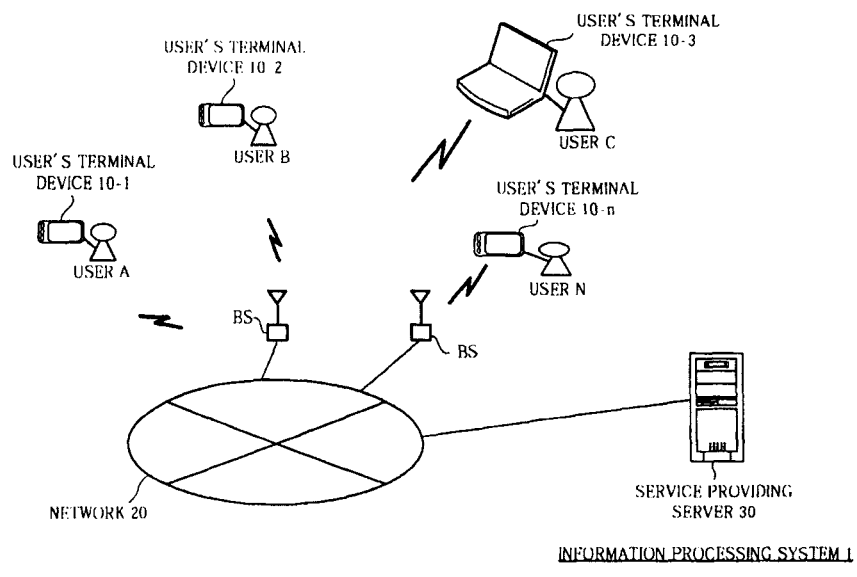
FIG. 1 is a system configuration diagram illustrating an embodiment of an information system configuration.

DETAILED DESCRIPTION OF THE EMBODIMENT (1) According to an embodiment of the invention, provided is an interactive service providing system that performs a service desired by a user based on scenario data that is a digitized scenario and that defines responses corresponding to a given input text by analyzing the input text, comprising:

a reception processor that receives instructions from an administrator who manages the scenario data;

a scenario generation and editing controller that generates or edits the scenario data by combining scenario component data that defines a predetermined script to configure the scenario data based on the received administrator's instructions;

a object arrangement and connection controller, when generating or editing the scenario data, based on the accepted administrator's instructions (A) that arranges a plurality of the scenario component data in an object space as objects, and (B) that controls connection and disconnection of two or more scenario component data arranged in the object space;

a determination processor that, when the two or more of the scenario component data are connected in the object space, performs a determination process that determines whether the group of scenario component data works properly or fails to work properly as at least a part of the scenario, the group of scenario component data having the two or more of the scenario component data; and a display controller that executes a display control process imaging the object space including the arranged scenario component data on a display, and displaying the result of the determination process on the display.

Based on the configuration, the one embodiment of the present invention can, for example, when an error occurs due to the connection or disconnection of two or more scenario component data, perform the display control process to indicate that the two or more scenario component data do not work properly, such as displaying an error or hiding an arrow for connecting the two or more scenario component data.

In other words, the one embodiment of the present invention allows a scenario to be generated or edited while checking the scenario configured by a plurality of scenario component data, each time a part of the scenario having the plurality of scenario component data is generated or edited, or when a part of the scenario is changed, during the generation or edition of the scenario data.

Specifically, the one embodiment of the present invention allows a scenario to be generated or edited while checking the scenario configured by a plurality of scenario component data, when performing generation or editing of scenario data by an input interface such as a keyboard or an input pointing device (e.g., a mouse) and a display (e.g., a monitor), and when displaying the scenario data (including the scenario component data) and the operation status corresponding to the administrator's operation and the like.

Further, in the one embodiment of the present invention,
(A1) when generating or editing a full-length scenario in which a large number of scenario component data are incorporated, a complex scenario which has a large number of branches (i.e., options), or an advanced scenario which has the full-length scenario and the complex scenario,
(A2) when a single scenario data is generated or edited by a plurality of administrators, or
(A3) when the scenario is edited such that the connection of a part of the scenario is changed in chronological order, the administrator can check or change the scenario without realizing each process of the scenario component data or a process of the specific scenario component data. Accordingly, the one embodiment of the present invention can be used easily by the administrator, and can significantly improve work efficiency and operability of the administrator.

Also, the one embodiment of the present invention can increase the degree of freedom when generating or editing the scenario, because error checking of each part of the scenario can be performed, and because the scenario can be generated or edited accurately without realizing the arrangement of the scenario component data or the connection of the scenario component data.

Therefore, the one embodiment of the present invention can reduce the administrator's effort during scenario generation and editing, and enable intuitive operation by reducing restrictions during generation and editing, thereby improving the administrator's convenience.

The "input text" is not particularly limited as long as it is input that can be converted into text such as character input or voice input.

For example, the term, "analyzing a given input text" may be an analysis based on machine learning such as morphological analysis, Kana-Kanji conversion, proofreading support, dependency parsing, key phrase extraction, and natural language understanding.

For example, the "user" means a user who receives predetermined information using the system of the present invention. Further, for example, the "administrator" means a manager that provides information with the user and that manages the system of the present invention.

For example, the term, "to provide the service desired by the user, with the users" means that the term, to provide a service that replaces a customer center or call center of the product or the service, such as: to provide the information (including inquires of predetermined product and service, image and sound) desired by the user; and to make inquiries regarding trade of the product or regarding the service or inquiries desired by the user to the administrator (by communication tools such as email and telephone), and to consummate their inquires (request of responses to their inquires).

Specifically, the information desired by the user includes, based on the input text as a retrieval key:
(B1) information (including contents) that is retrieved from a database in which various types of information are stored in advance in correspondence with the retrieval key; and
(B2) search results or searched information (including contents) retrieved by an external search engine and so on via a network.

The "scenario" has a plurality of scripts to provide the service desired by a user, and defines the content and order of each scrips, as well as a type of data required to execute the scripts and content of the data.

For example, the term, "to digitize a scenario," means a program executed at a predetermined timing.

For example, the "scenario component data that defines a predetermined script" indicates a node that defines a given script.

For example, the "scenario component data" or the "group of the scenario component data" indicates that two or more scenario component data connected in series, or a plurality of scenario component data connected in parallel to one scenario component data. Specifically, the "two or more scenario component data" or "the group of scenario component data" may be a scenario component data having a serial connection of the tree or parallel tree).

The "two or more scenario component data" may be one of the two or more scenario component data that has a same script of another one, and a same function of another one. Furthermore, the "two or more scenario component data" preferably indicates that a pair of nodes (i.e., two or more nodes) that are the relationship between input of the user and response to the input, and the input of the user and output to the input, such as content of an inquiry or a question and response to them, or a search request and a search result.

For example, "scenario component data" includes:
(C1) a node (hereinafter, referred to as a "user node") that analyzes the text input by the user or the button selected by the user and branches the scenario according to the content of the text or button;
(C2) a node (hereinafter, referred to as a "bot node") that provide the response or data from a chatbot (in other words, the system) with the user;
(C3) a node (hereinafter, referred to as a Q&A node) that presents a plurality of options to the user, such as Q&A, and executes a script based on the option selected by the user among from the plurality of options;

(C4) a node (hereinafter, referred to as a multiple Q&A node) that branches the scenario based on an option selected by the user after presenting the plurality of the options;

(C5) a node (hereinafter, referred to as a condition setting node) that branches the scenarios according to conditions;

(C6) a node (hereinafter referred to as a "notification node") that provides predetermined notification with the administrator or users via e-mail, chat and so on when users instruct to executes the script of the node;

(C7) a node (hereinafter referred to as a "jump node") that forcibly jumps to another node; and (C8) a node (hereinafter referred to as an "intent node") that forcibly executes a script defined for the node when a predetermined input text is accepted; and (C9) a node (hereinafter referred to as a "component node") that migrates another scenario in the node.

For example, the term, "connection and disconnection of two or more scenario component data," means that the two or more scenario component data are connected or disconnected both in the scenario and visually in the object space, via a connection object, such as an arrow object. Also, the term, "connection and disconnection of two or more scenario component data," means that the two or more scenario component data are connected or disconnected without connection object, or that the two or more scenario component data are connected or disconnected only in the scenario or only visually in the object space.

For example, the term, "failing to work properly," means that conditions or numbers of input and output do not match in relation to two continuously connected scenario component data immediately before or after (failure in the combination of scenario component data).

For example, "the result of the determination process" includes means that error display indicating that the group of scenario component data fails to work properly and works properly. Basically, in this case, the error indication is preferred.

For example, the "display control process" includes displaying identification information such as an ID in the vicinity of the scenario component data, on objects (e.g., arrows) connecting the scenario component data, or in an object space other than the object space in which the scenario component data, and displaying working properly or failing to working properly.

(2) Further, according to an embodiment of the invention, the determination processor, when a group of the scenario component data is arranged in the object space and is directly connected, may perform the determination process that determines whether the group of scenario component data works properly or fails to work properly as at least a part of the scenario.

When having the above configuration, the one embodiment of the present invention can, for example, determine defects in two or more directly connected scenario component data such as an error along the flow of the scenario and inform the administrator the defects.

Therefore, in this case, the one embodiment of the present invention can by instantly finding the defects such as the errors during the generation or editing of a scenario, reduce the administrator's workload, compared to the case where the existence of errors is notified only after the entire scenario is executed, and thus improve the administrator's convenience.

(3) Further, according to an embodiment of the invention, the two or more scenario component data may include a first scenario component data and a second scenario component data, the first scenario component data being set earlier on a time-series basis to execute a scenario than the second scenario component data that is different from the first scenario component data and that is arranged after the first scenario component data on the time-series basis.

When having the above configuration, the one embodiment of the present invention can instantly finding the defects such as the errors during the generation or editing of a scenario even when it is difficult to generate the scenario data formed by a single scenario component data, such as a a combination of an inquiry of the scenario and a response to the inquiry, a combination of presentation of options and processing of each option, or a combination of input of a search key and display of a search result based on the search key, and it is easy to operate and visually recognize the generation and editing the scenario data formed by a plurality of scenario component.

Therefore, in this case, the one embodiment of the present invention can be used with high work efficiency and improved convenience for the administrators, and can be used as an administrator without having advanced knowledge in the scenario generation or editing.

For example, the "precondition scenario component data" means first scenario component data that has to be executed before the second scenario component data that is executed.

(4) Further, according to an embodiment of the invention, the display controller, when the two or more scenario component data fails to work properly the determination process, may display the result of the determination process as the object, in association with the corresponding scenario component data as the display control process.

For example, when having the above configuration, the one embodiment of the present invention can visualize defects, such as errors, associated with the scenario component data used during the generation or editing of scenario data so that the administrator can recognize the defects such as the errors quickly and easily.

For example, the term, "display the result of the determining process as an object associated with the scenario component data" means that the result is displayed in the vicinity of the displayed scenario component data, or in an object space other than the object space in which the scenario component data with a name of the scenario component data. Further, the term includes that the object which indicates the result of the determining process and arranges in the object space displays and that the object displays by superimposing in the imaged object space.

(5) Further, according to an embodiment of the invention, the display controller may display an object of the result of the determination process on a connecting object that is for connecting between the corresponding plurality of scenario component data.

For example, when having the above configuration, the one embodiment of the present invention can visually inform the administrator of the defects easily during the generation or editing of scenario data.

For example, "connection object" includes a connector (e.g., an arrow indicating the flow of the scenario) used by flowcharts and the like.

(6) Further, according to an embodiment of the invention, the display controller may hide a connecting object that is for connecting from the specified scenario component data to a next scenario component data, as the display control process.

When having the above configuration, the one embodiment of the present invention can visualize defects, such as errors, associated with the scenario component data used during the generation or editing of scenario data, such as an inability to draw or disconnecting an arrow as a connection object from the corresponding scenario component data to the next scenario component data, and it is possible to forcibly prohibit the completion or continuation of scenario generation or editing, so that the administrator can easily identify errors quickly and easily.

For example, the "specified scenario component data" is a scenario component data included in the above two or more scenario component data, and is preferably one or more scenario component data executed chronologically later among the two or more scenario component data.

In this case, "next scenario component data" means that a scenario component data is executed after the scenario component data executed chronologically later among the two or more scenario component data.

(7) Further, according to an embodiment of the invention, when the specified scenario component data has a plurality of options of which one is selected by the user, the display controller may, as the display control process:

detect the number of the options of the specific scenario component data, the options being for connecting a next scenario component data that is available to be connected from the specific scenario component data; and permit to display as many connection objects as there are the detected number of the options of the specific scenario component data, based on the administrator's instructions.

When having the above configuration, the one embodiment of the present invention allows a scenario to be generated or edited while checking the scenario configured by a plurality of scenario component data, each time a part of the scenario having the plurality of scenario component data is generated or edited, or when a part of the scenario is changed, during the generation or edition of the scenario data.

(8) Further, according to an embodiment of the invention, the interactive service providing system may farther include a setting controller that sets a predetermined configurable item of the scenario component data arranged in the object space based on the administrator's instructions; and the determination processor that performs the determination process that determines whether the scenario component data having the set configurable item works properly or fails to work properly as the part of the scenario.

When having the above configuration, the one embodiment of the present invention allows a scenario to be generated or edited while checking the scenario configured by a plurality of scenario component data, each time a part of the scenario having the plurality of scenario component data is generated or edited, or when a part of the scenario is changed, during the generation or edition of the scenario data.

For example, the "configurable item" includes the number and content of options, the type and content of information to be provided to the user, and the type and content of input text to be accepted.

(9) According to the other embodiment of the invention, provided is the interactive service providing method that performs a service desired by a user based on scenario data that is a digitized scenario and that defines responses corresponding to a given input text by analyzing the input text, comprising:

receiving instructions from an administrator who manages the scenario data;

generating or edits the scenario data by combining scenario component data that defines a predetermined script to configure the scenario data based on the received administrator's instructions;

when generating or editing the scenario data, based on the accepted administrator's instructions, (A) arranging a plurality of the scenario component data in an object space as objects, and (B) controlling connection and disconnection of two or more scenario component data arranged in the object space;

when the two or more of the scenario component data are connected in the object space, performing a determination process that determines whether the group of scenario component data works properly or fails to work properly as at least a part of the scenario, the group of scenario component data having the two or more of the scenario component data; and executing a display control process imaging the object space including the arranged scenario component data on a display, and displaying the result of the determination process on the display.

When having the above configuration, the one embodiment of the present invention allows a scenario to be generated or edited while checking the scenario configured by a plurality of scenario component data, each time a part of the scenario having the plurality of scenario component data is generated or edited, or when a part of the scenario is changed, during the generation or edition of the scenario data.

Also, the one embodiment of the present invention can increase the degree of freedom when generating or editing the scenario, because error checking of each part of the scenario can be performed, and because the scenario can be generated or edited accurately without realizing the arrangement of the scenario component data or the connection of the scenario component data.

Therefore, the one embodiment of the present invention can reduce the administrator's effort during scenario generation and editing, and enable intuitive operation by reducing restrictions during generation and editing, thereby improving the administrator's convenience.

(10) According to the other embodiment of the invention, provided is a scenario generation and editing system that generates and edits scenario data that is used in an interactive service providing system that performs a service desired by a user based on scenario data that is a digitized scenario and that defines responses corresponding to a given input text by analyzing the input text, comprising:

a reception processor that receives instructions from an administrator who manages the scenario data;

a scenario generator that generates or edits the scenario data by combining scenario component data that defines a predetermined script to configure the scenario data based on the received administrator's instructions;

a object arrangement and connection controller, when generating or editing the scenario data, based on the accepted administrator's instructions (A) that arranges a plurality of the scenario component data in an object space as objects, and (B) that controls connection and disconnection of two or more scenario component data arranged in the object space;

a determination processor that, when the two or more of the scenario component data are connected in the object space, performs a determination process that determines whether the group of scenario component data works properly or fails to work properly as at least a part of the scenario, the group of scenario component data having the two or more of the scenario component data; and a display controller that executes a display control process imaging the object space including the arranged scenario component data on a display, and displaying the result of the determination process on the display.

When having the above configuration, the other embodiment of the present invention allows a scenario to be generated or edited while checking the scenario configured by a plurality of scenario component data, each time a part of the scenario having the plurality of scenario component data is generated or edited, or when a part of the scenario is changed, during the generation or edition of the scenario data.

Also, the other embodiment of the present invention can increase the degree of freedom when generating or editing the scenario, because error checking of each part of the scenario can be performed, and because the scenario can be generated or edited accurately without realizing the arrangement of the scenario component data or the connection of the scenario component data.

Therefore, the other embodiment of the present invention can reduce the administrator's effort during scenario generation and editing, and enable intuitive operation by reducing restrictions during generation and editing, thereby improving the administrator's convenience.

(11) According to the other embodiment of the invention, provided is a scenario generation and editing method that performs a service desired by a user based on scenario data that is a digitized scenario and that defines responses corresponding to a given input text by analyzing the input text, comprising:

receiving instructions from an administrator who manages the scenario data;

generating or edits the scenario data by combining scenario component data that defines a predetermined script to configure the scenario data based on the received administrator's instructions;

when generating or editing the scenario data, based on the accepted administrator's instructions, (A) arranging a plurality of the scenario component data in an object space as objects, and (B) controlling connection and disconnection of two or more scenario component data arranged in the object space;

when the two or more of the scenario component data are connected in the object space, performing a determination process that determines whether the group of scenario component data works properly or fails to work properly as at least a part of the scenario, the group of scenario component data having the two or more of the scenario component data; and executing a display control process imaging the object space including the arranged scenario component data on a display, and displaying the result of the determination process on the display.

When having the above configuration, the other embodiment of the present invention allows a scenario to be generated or edited while checking the scenario configured by a plurality of scenario component data, each time a part of the scenario having the plurality of scenario component data is generated or edited, or when a part of the scenario is changed, during the generation or edition of the scenario data.

Also, the other embodiment of the present invention can increase the degree of freedom when generating or editing the scenario, because error checking of each part of the scenario can be performed, and because the scenario can be generated or edited accurately without realizing the arrangement of the scenario component data or the connection of the scenario component data.

Therefore, the other embodiment of the present invention can reduce the administrator's effort during scenario generation and editing, and enable intuitive operation by reducing restrictions during generation and editing, thereby improving the administrator's convenience.

Hereinafter, embodiments of the present invention will be described with reference to the drawings. It should be noted that the following embodiments are embodiments wherein interactive service providing systems and the like according to the present invention, are applied to an information processing system that automatically responses to an inquiry of a user by performing an interactive mode with a chatbot.

[1] Outline of the Information Processing System

First, the outline and configuration of the information processing system 1 in the present embodiment will be described with reference FIG. 1.

FIG. 1 is a system configuration diagram illustrating an embodiment of an information processing system configuration.

In order to prevent the drawings from becoming complicated, only some users and only communication terminal devices are shown in FIG. 1. In other words, more users, and communication terminal devices, and the like are than shown in FIG. 1.

The information processing system 1 in the present embodiment is a system that provides a service that replaces a customer center or call center of the product or the service, such as:

(A1) a service that provides information (including inquires of a predetermined product and a predetermined service, and contents including image and sound) desired by the user;

(A2) a service that provides information regarding trade of the product or the service or trades the product or the service; and (A3) a service that makes and consummate inquiries (request of responses to their inquires) desired by the user (by communication tools such as email and telephone) to the administrator who provides a service (for example, a provider or a contact person who provides information desired by the user, or a manager who manages the information processing system 1).

Specifically, the information processing system 1 has a configuration for providing as information desired by the user includes, based on the input text as a retrieval key:

(A1-1) information (including contents) that is retrieved from a database in which various types of information are stored in advance in correspondence with the retrieval key; or (A1-2) search results or searched information (including contents) retrieved by an external search engine and so on via a network.

Further, the information processing system 1 in the present embodiment has a configuration for providing responses to inputs and output items, such as inquiries, questions, or search requests from the user, while using a predetermined scenario and performing an interactive mode in response to the inputs from the user based on the scenario.

Specifically, the information processing system 1 in the present embodiment has: a user's terminal device 10 used by the user; and a service providing server 30 which is managed by a manager who provide a service, to which the user's terminal device 10 connected via a network 20, and which provides the service using a chatbot system, to the user who has the user's terminal device 10.

The user's terminal device 10 is a communication terminal device used by users such as a PC (personal computer), a tablet-type information communication terminal device, a smart phone, and a mobile phone.

Specifically, the user's terminal device 10 has: an operation unit, such as a keyboard, a mouse, and a numeric keypad; and a display unit having a display element such as a liquid crystal panel and an organic EL (Electro Luminescence) panel.

The user's terminal device 10 has a CPU that executes a predetermined application, and is configured to execute data communication with the service providing server 30, to enjoy the service desired by the user.

Further, the user's terminal device 10 transmits the input text as text data to the service providing server 30 when the text is input by the user, or performs a given voice analysis or an image analysis in order to convert the voice data or image data into text data and transmits the converted text data to the service providing server 30.

The service providing server 30 is a computer system having various databases (hereinafter referred to as "DB"). Further, the service providing server 30 is a system managed by a service provider or an administrator who manages the service (hereinafter collectively referred to as "administrators").

The service providing server 30 is configured to analyze to analyze a given text input by a user (hereinafter referred to as "input text"), and to provide a service desired by each user using a scenario such as a service using a chatbot in which the response corresponding to the input text is defined.

The service providing server 30 is configured to execute the generation or editing of scenario data in which scenarios for operating such services are digitized, and to provide various services in accordance with the generated or edited scenario data.

Specifically, the information processing system 1 in the present embodiment t is configured to allow a scenario to be generated or edited while checking the scenario configured by a plurality of scenario component data, each time a part of the scenario having the plurality of scenario component data is generated or edited, or when a part of the scenario is changed, during the generation or edition of the scenario data.

Further, the information processing system 1 is configured to allow a part of the scenario which corresponds to specified scenario component data to be generated or edited while checking the scenario, when performing generation or editing of the scenario data by an input interface such as a keyboard or an input pointing device (e.g., a mouse) and a display (e.g., a monitor), and when displaying operation status in accordance with the administrator's operation.

Specifically, the service providing server 30 is configured to execute:

(B1) a receiving process that receives instructions from an administrator who manages the scenario data;

(B2) a scenario generation and editing that generates or edits the scenario data by combining scenario component data that defines a predetermined script to configure the scenario data based on the received administrator's instructions;

(B3) an object arrangement and connection control process, when generating or editing the scenario data, based on the accepted administrator's instructions, (B3-1) that arranges a plurality of the scenario component data in an object space as objects, and (B3-2) that controls connection and disconnection of two or more scenario component data arranged in the object space;

(B4) when the two or more scenario component data that are arranged in the object space is connected (for example, when connecting the two or more scenario component data directly), performing determination process that determines whether an integrated process of the group of scenario component data works properly or fails to work properly as at least a part of the scenario; and (B5) a display control process that images the object space including the arranged scenario component data on a display, and displaying the result of the determination process on the display.

Specifically, the service providing server 30 performs the determination process that determines whether an integrated process of the group of scenario component data works properly or fails to work properly as at least a part of the scenario when two or more scenario component data forming a group of scenario component data are defined back and forth chronologically (for example, the first scenario component data set first in the scenario and the second scenario component data connected to the first scenario component data and set after the first scenario component data chronologically).

For example, in the information processing system 1 of the present embodiment, (C1) when generating or editing a full-length scenario in which a large number of scenario component data are incorporated, a complex scenario which has a large number of branches (i.e., options), or an advanced scenario which has the full-length scenario and the complex scenario, (C2) when a single scenario data is generated or edited by a plurality of administrators, or (C3) when the scenario is edited such that the connection of a part of the scenario is changed in chronological order, the administrator can check or change the scenario without realizing each process of the scenario component data or a process of the specific scenario component. Accordingly, the information processing system 1 can be used easily by the administrator, and can significantly improve work efficiency and operability of the administrator.

Also, the information processing system 1 of the present embodiment can increase the degree of freedom when generating or editing the scenario, because error checking of each part of the scenario can be performed, and because the scenario can be generated or edited accurately without realizing the arrangement of the scenario component data or the connection of the scenario component data.

Therefore, the information processing system 1 of the present embodiment can reduce the administrator's effort during scenario generation and editing, and enable intuitive operation by reducing restrictions during generation and editing, thereby improving the administrator's convenience.

[2] Service Providing Server

[2.1] Configuration

Figure 2:
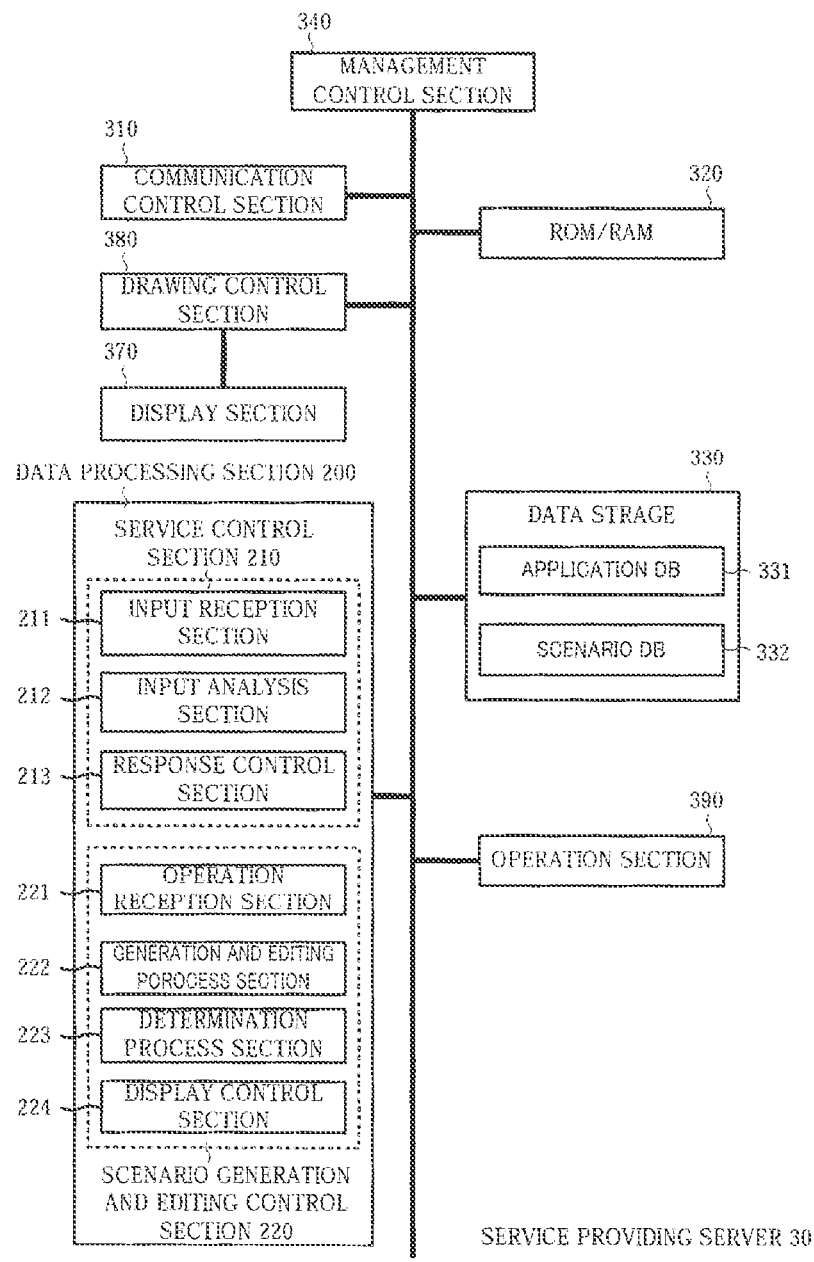
FIG. 2 is a diagram illustrating functional blocks of a service providing server of the embodiment.

Next, the configuration of the service providing server 30 of the present embodiment will be described with reference to FIG. 2. FIG. 2 is a diagram illustrating functional blocks of a service providing server 30 of the present embodiment.

The communication control section 310 is a predetermined network interface and builds communication channels with terminal devices 10 for each user, and transfers various data to the terminal devices 10.

In the ROM/RAM 320, various programs necessary for operating the service providing server 30. Also, the ROM/RAM 320 is used as a work area when various processes are executed.

The data base 330 is configured by an HDD or SSD (Solid State Drive).

The data base 330 has the application DB 331 in which various applications are stored, and the scenario DB 332 in which scenario data generated by user and each scenario component data defining the basic script used when generating the scenario data, are stored.

In the application DB 331, at least, applications (hereinafter referred to as "service operation applications") to provide various services using scenarios and chatbots that have been set in advance based on user input are stored, an application (hereinafter referred to as the "scenario generation and editing application") to generate scenarios for services to be provided using the chatbot, and various data used in executing the applications, are stored.

In the scenario DB 332, the scenario data set by the administrator and the scenario component data used in generating the scenario data, are stored.

The scenario data is a data set by the administrator, has a plurality of scripts to provide the service desired by a user, and defines the content and order of each scrips, as well as a type of data required to execute the scripts and content of the data, in order to provide the service using the chatbot.

The scenario data has data structure to provide various services in cooperation with external databases and the various applications mentioned above.

The scenario component data is data that defines each of predetermined scripts in the scenario.

For example, the scenario component data includes:

(A1) a node (hereinafter, referred to as a "user node") that analyzes the text input by the user or the button selected by the user and branches the scenario according to the content of the text or button;

(A2) a node (hereinafter, referred to as a Q&A node) that presents a plurality of options to the user, such as O&A, and executes a script based on the option selected by the user among from the plurality of options;

(A3) a node (hereinafter, referred to as a Q&A node) that presents a plurality of options to the user, such as O&A, and executes a script based on the option selected by the user among from the plurality of options;

(A4) a node (hereinafter, referred to as a multiple Q&A node) that branches the scenario based on an option selected by the user after presenting the plurality of the options;

(A5) a node (hereinafter, referred to as a condition setting node) that branches the scenarios according to conditions;

(A6) a node (hereinafter referred to as a "notification node") that provides predetermined notification with the administrator or users via e-mail, chat and so on when users instruct to executes the script of the node;

(A7) a node (hereinafter referred to as a "jump node") that forcibly jumps to another node;

(A8) a node (hereinafter referred to as an "intent node") that forcibly executes a script defined for the node when a predetermined input text is accepted; and (A9) a node (hereinafter referred to as a "component node") that migrates another scenario in the node.

The management control section 340 has a central processing unit (CPU), mainly, and performs integrated control of each part of the service providing server 30 by executing a program.

The data process section 200 is configured with the same central processing unit (CPU) as the management control section 340 or with a different central processing unit (CPU) from the management control section 340, and executes various processes by applications.

Specifically, data process section 200 includes: the service control section 210 that executes a service provision process for providing services using the chatbot based on a scenario set by an administrator; and a scenario generation and editing section 220 that performs a scenario generation and editing process for generating a new scenario or editing an already generated scenario based on instructions from an administrator.

The details of the service control section 210 and the scenario generation and editing control section 220, and their operations in the present embodiment will be described later.

The display 370 is configured by a CRT, LCD, touch panel type display, or HMD (head mounted display) and so on, and displays images related to various tasks based on task data or images related to the measurement results of cognitive functions. For example, the display 370 of the present embodiment serves as display of the present invention.

The drawing control section 380 generates images for displaying the object space including the arranged scenario component data and the results of the determination process on the display 370.

The operation section 390 is used for inputting operation data by the administrator, and is configured by a touch panel or a touch panel type display.

Specifically, the operation section 390 has a detection section (touch panel) that is capable of detecting two-dimensional instruction position coordinates (x, y) on a screen on which images are displayed on the display section 370, and detects contact operations on the touch panel using an input device such as a fingertip or a touch pen.

Further, the operation section 390 may have buttons, levers, a keyboard, a microphone, an acceleration sensor, a mouse, a track pad, or an input device using line of sight (eye input device), etc. that can input operation information (operation signals) other than the indicated position.

[2.2] Service Providing Process

Next, details of the service providing process executed by the service control section 210 of this embodiment will be described.

In order to execute the service providing process by executing a service operation application, the service control section 210 has: an input reception section 211 that receive data (hereinafter referred to as "input data") such as text input by a user at the user's terminal device 10; an input analysis section 212 that analyzes the input data and recognizes the user's instructions; and a response control section 213 that executes a predetermined process based on the recognized user's instructions and provides the user with desired information as a response.

The input reception section 211 may receive text data input by the user, voice data, or image data.

When receiving the text data, the input reception section 211 outputs the received text data to the input analysis section 212. When receiving the voice data, or the image data, the input reception section 211 converts the data to text data by performing a given voice analysis or image analysis, and outputs the converted text data to the input analysis section 212.

The input analysis section 212 performs various natural language process, such as morphological analysis, kana-kanji conversion, proofreading support, clause analysis, key phrase extraction, and natural language understanding, on the input text data, i.e., the input text input by the user, and recognizes the accepted user instructions.

For example, the response control section 213 executes, based on the recognized user instructions:

(1) to provide the information (including inquires of predetermined product and service, image and sound) desired by the user;

(2) to make inquiries regarding trade of the product or regarding the service or inquiries desired by the user to the administrator (by communication tools such as email and telephone), and to consummate the inquires (request of responses to the inquires); and (3) display control of an image that prompts the corresponding user to re-enter.

[2.2] Scenario Generation and Editing Process

Next, details of the scenario generation and editing process executed by the scenario generation and editing control section 220 of this embodiment will be described with FIG. 3 to FIG. 9B.

Figure 3:
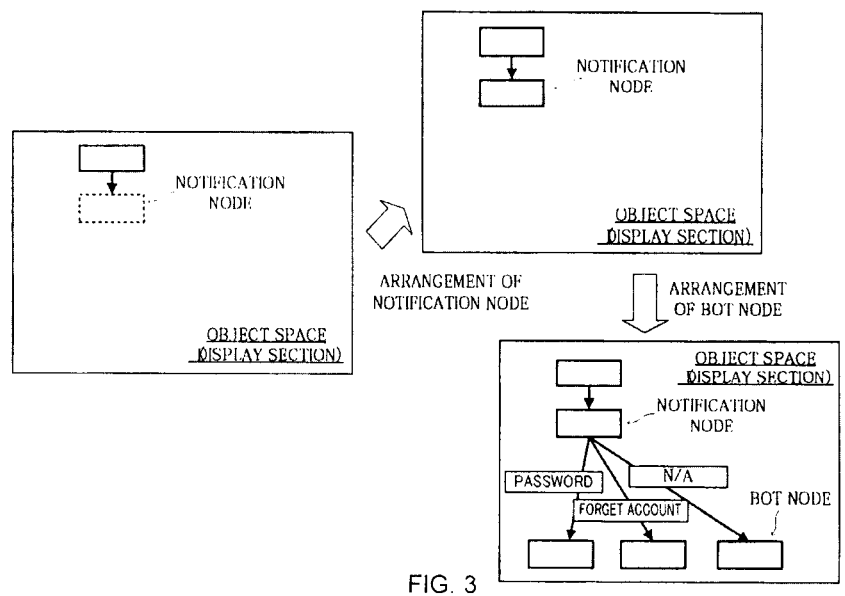
FIG. 3 is a diagram for explaining the arrangement control process executed by the service providing server of the embodiment.
Figure 4:
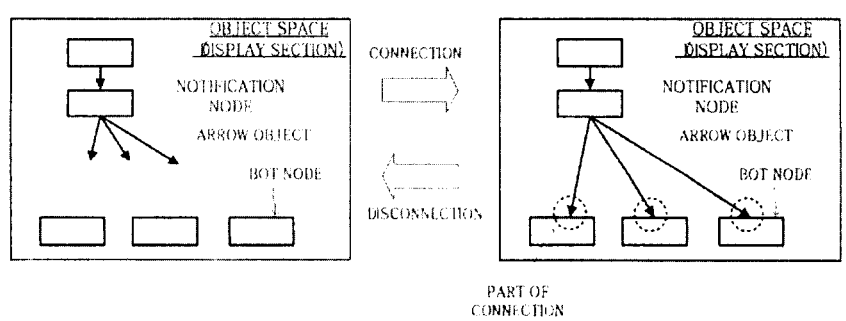
FIG. 4 is a diagram for explaining the connection and disconnection control process performed by the service providing server of the embodiment.

FIG. 3 is a diagram for explaining the arrangement control process of the embodiment, and FIG. 4 is a diagram for explaining the arrangement control process executed by the service providing server of the present embodiment. FIGS. 5A to 6B are diagrams for explaining the determination process of the present embodiment. FIGS. 7A to 9B are diagrams for explaining the display control process performed of the present embodiment.

(Configuration of the Scenario Generation and Editing Control Section)

The scenario generation and editing control section 220, to execute the scenario generation and editing process, has:

(A1) an operation reception section 221 that executes the reception process to receive the administrator's instructions input via the operation section 390;

(A2) a generation and editing process section 222 that performs an object arrangement connection control process that controls the generation or editing of the scenario data based on the scenario component data;

(A3) a determination process section 223 that performs determination process that determines whether an integrated process of the group of scenario component data works properly or fails to work properly as at least a part of the scenario, when two or more scenario component data placed in the object space are connected; and (A4) a display control section 224 that images the object space including the arranged scenario component data on a display.

For example, the operation reception section 221 of this embodiment serves as the reception processing unit, the generation and editing process section 222 serves as the scenario generation and editing unit and the object arrangement connection control unit. For example, the determination process section 223 of this embodiment serves as the judgment unit, and the display control section 224 serves as the display control unit.

(Object Arrangement Connection Control Process)

The generation and editing process section 222 that generates or edits the scenario data by combining the scenario component data that defines a predetermined script to configure the scenario data based on the received administrator's instructions.

Specifically, the generation and editing process section 222, when generating or editing the scenario data, based on the accepted administrator's instructions, executes the object arrangement connection control process including:

(B1) an object arrangement process that arranges a plurality of the scenario component data in an object space as objects; and (B2) a connection and disconnection control process that controls connection and disconnection of two or more scenario component data arranged in the object space.

The generation and editing processing section 222 performs determination process that determines whether an integrated process of the group of scenario component data works properly or fails to work properly as at least a part of the scenario when the two or more scenario component data that are arranged in the object space is connected (for example, when connecting the two or more scenario component data directly).

(Object Arrangement Process (Object Arrangement Connection Control Process))

The generation and editing process section 222 identifies the type of the scenario component data based on the accepted instructions of the administrator, and arranges the scenario component data of the identified type as an object at the specified coordinate position in the object space.

Specifically, the generation and editing process section 222 performs a process for arranging a various type of objects that is display objects when imaging the object space, such as an object (hereinafter referred to as a "processing symbol object," please note that, in the following, in some cases, the object may also be referred to as scenario component data), an arrow object (hereinafter referred to as an "arrow object") to connect two or more processing symbol objects, and a display object on which the arrow object and the processing symbol object.

The generation and editing process section 222 determines the position and rotation angle (synonymous with orientation and direction) of each object (model object), and arranges or moves the object at its coordinate position (X, Y) or (X, Y, Z) with its rotation angle (rotation angle around X and Y axis) or (rotation angle around X, Y and Z axis).

The object space includes both the virtual two-dimensional space and the virtual three-dimensional space, as it is called. For example, a two-dimensional space is a space where objects are arranged in two-dimensional coordinates (X, Y), and a three-dimensional space is a space where objects are arranged in three-dimensional coordinates (X, Y, Z).

Specifically, the generation and editing process section 222 may, for each scenario component data, arrange the specified type of scenario component data as a processing symbol object at the specified coordinate position based on the accepted administrator's instructions, or may arrange the two or more related scenario component data, such as a user node and a multi-node, at the specified coordinate positions as processing symbol objects based on accepted administrator instructions.

In other words, since a user node or the like requires a node having a script after the node to execute the scenario, the generation and editing process section 222 of this embodiment may arrange a node (a multi-node that changes into various nodes) to be processed after the node to execute in the scenario when arranging the user node and the condition setting node.

For example, as shown in FIG. 3A, when receiving the instruction to arrange the notification node, which has decision branches as the second node from the start of the scenario via the operation reception section 221, the generation and editing process section 222, as shown in FIG. 3B, arranges the notification node.

Next, as shown in FIG. 3C, when further receiving the instruction that the arranged notification node has three options, the generation and editing process section 222: arranges the bot node for each of the options; arranges the arrow object as a connection object from the notification node to each bot node; and arranges the display object for displaying the conditions of the decision branch on each arrow object.

FIG. 3 shows that an arrow object as a connection object is arranged together with the processing symbol object. As described below, only the processing symbol object may be arranged, and then the arrow object may be arranged based on the administrator's instructions.

On the other hand, the generation and editing process section 222 also has a configuration to move, within the object space, the coordinate positions of the processing symbol objects already arranged in the object space, based on the accepted administrator's instructions.

At this time, the generation and editing process section 222 prefers to move the end portion of the arrow object connected to the processing symbol object with the processing symbol object to be moved, and to control to elongate the arrow object (elongation control when the other end portion of the arrow object is fixed). It is preferable to execute the control.

In this case, the generation and editing process section 222 prefers to move the display object superimposed on the processing symbol object and the arrow object to be moved with the processing symbol objects and the arrow object.

(Connection and Disconnection Control Process)

The generation and editing process section 222, as the connection and disconnection control processing, visually connects two or more scenario component data already arranged as processing symbol objects in the object space, or disconnects two or more scenario component data that are already connected, based on the accepted administrator's instructions and using the arrow object, or disconnects two or more scenario component data.

Specifically, the generation and editing process section 222, as the connection and disconnection control processing, based on the accepted administrator's instructions, performs:

(1) control to connect one end of the arrow object that is not yet connected to the processing symbol object to the processing symbol object (control to connect the one end of the arrow object to one of the outer edges of the processing symbol object); and (2) control to disconnect the arrow object already connected to the processing symbol object from the point of connection to the processing symbol object.

For example, the generation and editing process section 222 performs control to connect two or more scenario component data visually in the scenario, and in the object space via connection objects, such as connectors (e.g., arrows indicating the flow of the scenario) used by flowcharts, and control disconnect such connection.

For example, the generation and editing process section 222, as shown in FIGS. 4A and 4B, may arrange, in the object space at the same time, the connection object, with one end already connected to a predetermined outer edge of the processing symbol object to be arranged, when arranging the processing symbol object of the specific type in the object space. Further, the generation and editing process section 222 may arrange two ends of the object which has not set yet as the scenario component data, based on the administrator's instructions, and connect the two ends of the arranged scenario component data to the processing symbol object.

FIG. 4A shows a diagram showing the state in which the notification node and the bot node are disconnected, and FIG. 4B shows another diagram showing the state in which the notification node and the bot node are connected.

As shown in FIG. 3 above, each time a processing symbol object is arranged in the object space, the generation and editing process section 222 may arrange the number of connection objects corresponding to the processing content of the processing symbol object so as to connect the connection objects from the outer edge of the processing symbol object.

On the other hand, when executing connection control or disconnection control of the arrow object as described above, the generation and editing process section 222 rewrites the script specified in the corresponding scenario component data into scripts for executing the processing of the processing symbol objects connected in the order in the scenario data.

Specifically, when one end of the arrow object is connected to the processing symbol object (hereinafter referred to as the "connection target object"), the generation and editing process section 222 rewrites the scrip of the connection target base object so that the connection target object is executed after executing processing symbol object (hereinafter referred to as the "connection target base object"), to which another end of the arrow object is connected.

When the arrow object, of which the both ends has already been connected to the processing symbol objects, respectively, is disconnected from one of the processing symbol objects at one end (hereinafter referred to as the "destination object"), based on the administrator's instructions, the generation and editing process section 222 may reset or maintain the scripts of the processing symbol objects including the processing symbol objects (hereinafter referred to as the "source processing symbol object") which has still connected to the arrow object and the script of the destination object.

The generation and editing process section 222 can edit the scenario by the such configuration such as re-connecting the nodes, that is, changing the processing order of the scenario component data on the scenario, adding a new scenario component data to the scenario, and deleting the scenario component data.

(Determination Process)

The determination process section 223 performs the determination process that determines whether an integrated process of the group of scenario component data works properly or fails to work properly as at least a part of the scenario, when the two or more scenario component data that are arranged in the object space is connected (including directly connected or indirectly connected). For example, the two or more scenario component data indicates that a pair of nodes (i.e., two or more nodes) that are the relationship between input of the user and response to the input, and the input of the user and output to the input, such as content of an inquiry or a question and response to them, or a search request and a search result.

The determination process section 223 performs the determination process to determine every time the scenario component data group, which has the two or more scenario component data (i.e., processing symbol objects) that are series-connected or parallel-connected, is formed.

The determination process section 223 may perform the determination process regarding the scenario component data group that has the multiple scenario component data with the same script or the same function, or that has the multiple scenario component data with the different script or the different function.

The determination process section 223 performs the determination process when the connection and disconnection in the two or more scenario component data are executed, such as when the two or more scenario component data are visually connected in the scenario and in the object space via a connection object such as an arrow object, or when the connection is disconnected.

The determination process section 223 performs the determination process determines whether the two or more scenario component data, which are continuatively connected just before or immediately after the determination process, or works properly or fails to work properly, such as whether or not the options presented to the user match the number which is actually executed as the option process, and whether or not the process required to perform a specific process is performed.

For example, the determination process section 223 determines whether an integrated process of the group of scenario component data works properly or fails to work properly as a part of the scenario by determining whether or not conditions or the numbers of the input and the output match.

Specifically, the determination process section 223 performs the determination process that determines whether the group of scenario component data, which includes the two or more scenario component data, works properly or fails to work properly as the part of the scenario when the group of scenario component data includes a first scenario component data and the second scenario component data which is arranged after the first scenario component data on a time-series basis. Please note that the first scenario component data has to be executed before the second scenario component data that is executed.

Specifically, the determination process section 223 determines whether the number of options (i.e., the number of outputs) in the scenario required in the second scenario component data by the processing of the first scenario component data to be executed first matches and the actual number of options in the second scenario component data when the two or more directly connected scenario component data in the object space include the first and second scenario component data.

Figure 5A:
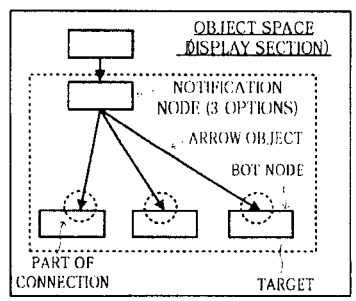
FIG. 5A is a diagram for explaining the determination process performed by the service providing server of the embodiment.
Figure 5B:
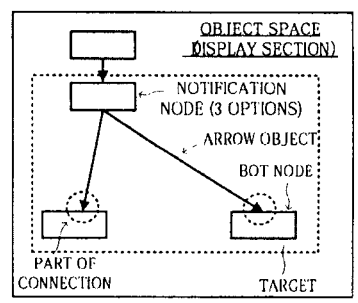
FIG. 5B is a diagram for explaining the determination process performed by the service providing server of the embodiment.

For example, in the case where three options are included in the first scenario component data (notification node) and the connection of the second scenario component data (bot node) is requested in each of the three options, the determination process section 223 determines whether or not the three second scenario component data (bot node) are connected to the first scenario component data (notification nodes), respectively, as shown in FIGS. 5A and 5B.

FIG. 5A shows an example in which three bot nodes are arranged when performing the determination process, and FIG. 5B shows an example in which two bot nodes are arranged when performing the determination process. Further, example in FIG. 5A shows the case in which normal operation is determined to work properly, and the example in FIG. 5B shows the case in which normal operation is determined to fail to work properly.

Further, the determination process section 223 may determine whether or not the process required for the premise of execution of the second scenario component data is executed as the first scenario component data when two or more scenario component data are directly connected in the object space.

Figure 6A:
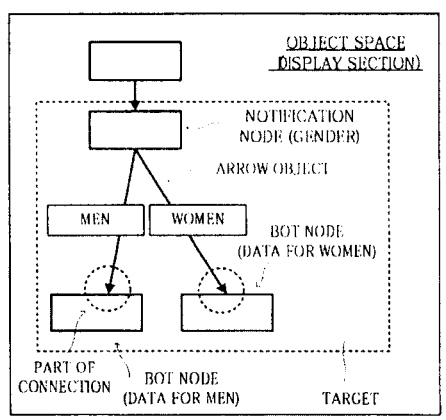
FIG. 6A is a diagram for explaining the determination process performed by the service providing server of the embodiment.
Figure 6B:
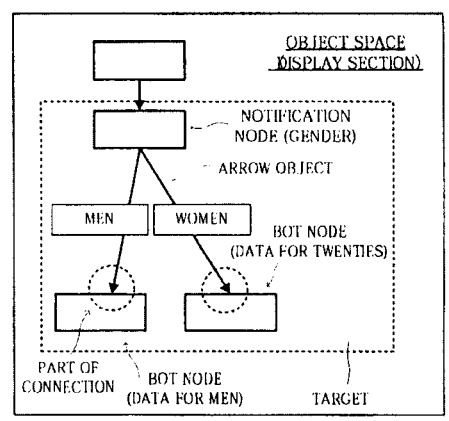
FIG. 6B is a diagram for explaining the determination process performed by the service providing server of the embodiment.

For example, when executing a predetermined process based on the input of gender (presenting a question based on gender) in the second scenario component data, the determination process section 223 determines whether or not a process of the second scenario component data corresponding to the input of gender is executed, as shown in FIGS. 6A and 6B.

FIG. 6A shows the case where the scenario component data for providing data for men or for women is set as the second scenario component data, and FIG. 6B shows the case where the scenario component data for providing data for men or for 20-somethings is set as the second scenario component data. The example in FIG. 6A shows a case in which normal operation is determined to be possible, and the example in FIG. 6B shows a case in which normal operation is judged to be impossible. The example in FIG. 6B shows the case where normal operation is judged to be impossible.

(Display Control Process)

The display control section 224 performs the display control process that images the object space including the arranged scenario component data, and the result of the determination process on the display, for example, a monitor, such as error display indicating that at least the part of the scenario having the arranged scenario component data fails to work properly and the normal display indicating that the at least the part of the scenario having the arranged scenario component data works properly.

Specifically, the display control section 224 performs display control process to display the result of the determination process as the object when determining that at least the part of the scenario having the arranged scenario component data fails to work properly, by the determination process.

For example, the display control section 224 displays:
 (1) the object indicating the result of the determination process in the vicinity of the object of the scenario component data (in the above case, the second scenario component data) that is the target of the determination process;
 (2) the object indicating the result of the determination process on the connection object (that is, the arrow object) that is an object for connecting the scenario component data which is the target of the determination process; and (3) the object indicating the result of the determination process with a name of the scenario component data (for example, ID) in another object space (hereinafter referred to as the "sub-object space") that is different from the object space (hereinafter referred to as the "main object space") in which the scenario component data is arranged.

For example, assume a case that a group of scenario component data including scenario component data which has a script of options and scenario component data which has a script for executing the processes of each of the options is determined to fail to work properly, as a part of the scenario.

Figure 7A:
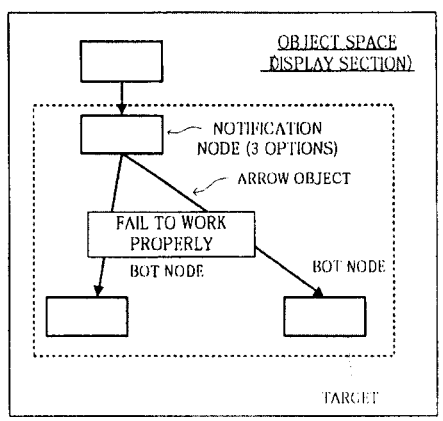
FIG. 7A is a diagram for explaining the display control process performed by the service providing server of the embodiment.
Figure 7B:
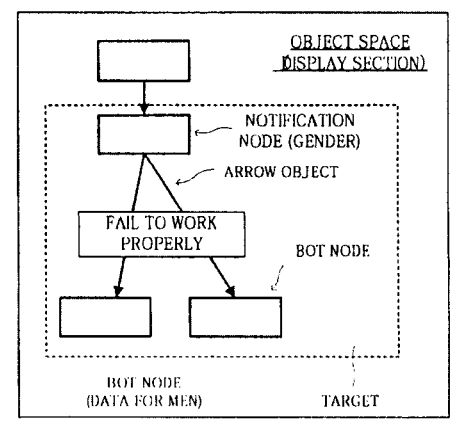
FIG. 7B is a diagram for explaining the display control process performed by the service providing server of the embodiment.

In this case, when the scenario component data having the options (i.e., the first scenario component data) and the scenario component data for executing scripts of each option (i.e., the second scenario component data) are connected, the display control section 224 displays, as a display control process, the result of the determination process as shown in FIGS. 7A and 7B, on the arrow object connecting the first scenario component data and the second scenario component data, and arranges and displays the working failure object indicating failure to work properly.

Figures 8A, 8B:
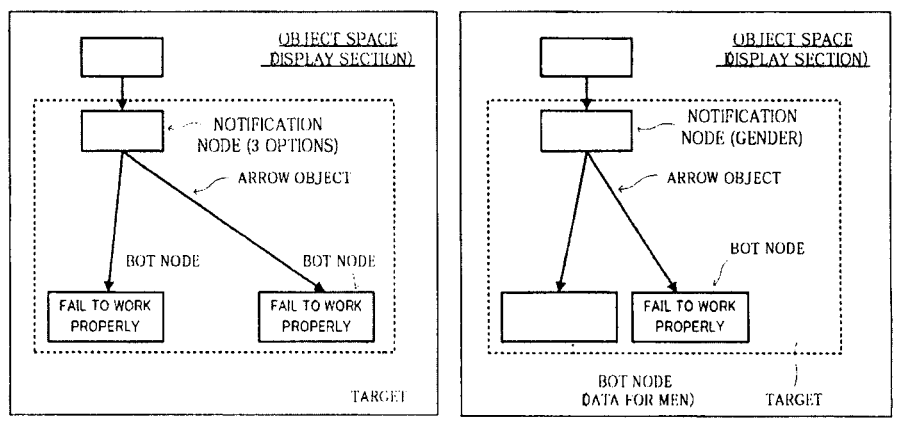
FIG. 8A is a diagram for explaining the display control process performed by the service providing server of the embodiment.
FIG. 8B is a diagram for explaining the display control process performed by the service providing server of the embodiment.
Figure 9A:
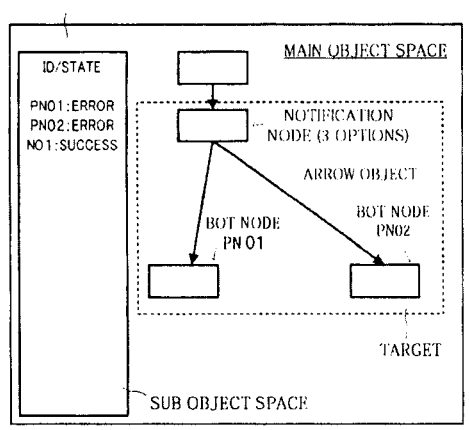
FIG. 9A is a diagram for explaining the display control process performed by the service providing server of the embodiment.
Figure 9B:
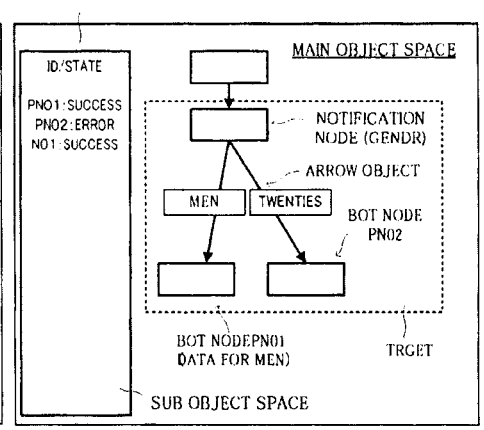
FIG. 9B is a diagram for explaining the display control process performed by the service providing server of the embodiment.

As shown in FIGS. 8A and 8B, the display control section 224 may display the working failure object indicating the result of the determination process on the second scenario component data instead of the arrow object. Further, as shown in FIGS. 9A and 9B, the display control section 224 may display the result of the determination process with identification information of the scenario component data (i.e., the ID of the second scenario component data) in the sub-object space.

[3] Operation of the Scenario Generation and Editing Process

Next, the scenario generation and editing process (object arrangement connection control process (connection disconnection control process), determination process and display control process) executed in the service providing server 30 in this embodiment will be described using FIG. 10.

Figure 10:
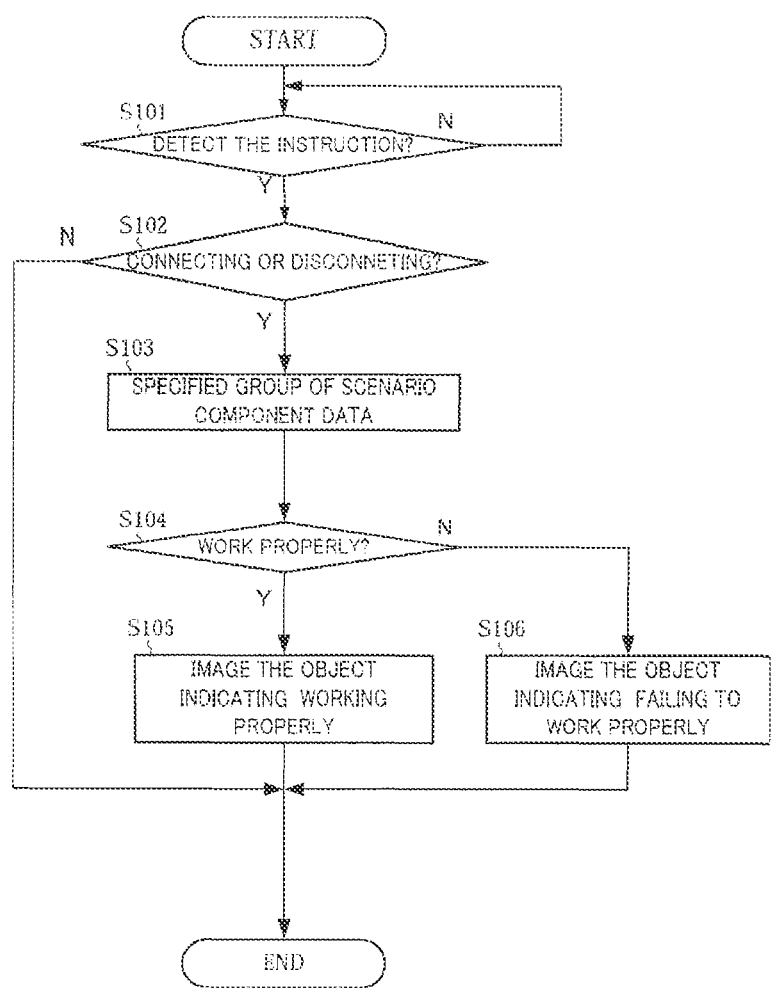
FIG. 10 is a flow chart illustrating the scenario generation and editing process including the object arrangement connection control process (a connection disconnection control process), the determination process and the display control process performed by a service providing server of the embodiment.

FIG. 10 is a flow chart illustrating the scenario generation and editing process including the object arrangement connection control process (a connection disconnection control process), the determination process and the display control process performed by a service providing server 30 of the embodiment.

This operation assumes that the generation and editing process section 222 is performing the object arrangement connection control process during the scenario generation and editing process, and is executed when the administrator's instructions accepted by the operation reception section 221 are to disconnect or connect the scenario component data during the arrangement control process during the object arrangement connection control process.

First of all, when detecting that an administrator's instruction has been accepted by the operation reception section 221 (step S101), the scenario generation and editing control section 220 determines whether the accepted administrator's instruction is the instruction to control (hereinafter referred to as "connection control") for connecting one end of an arrow object that is not yet connected to a processing symbol object to one of the processing symbol objects, or to control (hereinafter referred to as "disconnection control") for disconnecting one end of the arrow object of which the both ends has already connected to the processing symbol objects (step S102).

At this stage, the generation and editing process section 222 terminates this operation when the accepted administrator's instruction is not the instruction to connection control and disconnection control.

On the other hand, when determining that the accepted administrator's instruction is the instruction connection control or a disconnection control of an arrow object, the generation and editing process section 222 shifts to the process of step S103.

Next, the determination process section 223 identifies the group of scenario component data including the connected scenario component data (step S103), and executes the determination process to determine whether the integrated process of the group of scenario component data works properly or fails to work properly as the part of scenario (step (Step S104).

At this stage, when the integrated process of the corresponding group of the scenario component data works properly as the part of the scenario, the display control section 224 arranges the object (i.e., the processing symbol object) of the corresponding group of the scenario component data, with the object indicting that the group of the scenario component data works properly, in the object space, and image these objects (step S105), and then terminates this operation.

Conversely, when the integrated process of the corresponding group of the scenario component data fails to work properly as the part of the scenario, the display control section 224 arranges the object of the corresponding group of the scenario component data, with the object indicting that the group of the scenario component data fails to work properly, in the object space, and image these objects (step S105), and then terminates this operation.

[4] Variations

Next, variations of the present embodiment will be described.

Variation Example 1

In the present embodiment, when it is determined by the determination process that the group of the scenario component data, which includes the scenario component data arranged in the object space based on the administrator's instruction and connected to another scenario component data using the displayed arrow object, fails to work properly, the display control section 224 may hide the connection object (i.e., the arrow object) to connect the next scenario component data from the corresponding scenario component data.

For example, during generation or editing the scenario data, when arranging a new scenario component data, the determination process section 223 arranges the arrow object, which has one end is not connected to any scenario component data, for connecting to the next scenario component data from the new scenario component data, in the object space in the state in which the one end of the arrow object connects to the new scenario component data.

Farther, when the arrow object has connected already as the connecting object from the corresponding scenario component data to next scenario component data, and when it is determined by the determination process that the group of the scenario component data including these scenario component data fails to work properly, the display control section 224 may hide the arrow object for connecting from the scenario component data, which is executed later in chronological order among from the corresponding two or more scenario component data, to the next scenario component data.

Variation Example 2

The scenario generation and editing control section 220 of the present embodiment sets the predetermined settable items of the scenario component data arranged in the object space based on the accepted administrator's instructions.

In this case, the determination process section 223 may perform the determination process for determination that the predetermined process works properly or fails to work properly as the part of the scenario based on the scenario component data having the set item.

For example, in this case, the determination process section 223 sets the item, such as the number and content of options, the type and content of information to be provided to the user, and the type and content of input text to be accepted.

Further, in this case, similar to the above, the display control section 224 performs the display control process that displays the result of the determination process as the object when it is determined by the determination process that the group of the scenario component data fails to work properly, in association with the corresponding scenario component data.

For example, the display control section 224 displays:
(1) the object indicating the result of the determination process in the vicinity of the object of the scenario component data that is the target of the determination process;
(2) the object indicating the result of the determination process on the connection object (that is, the arrow object) that is an object for connecting the scenario component data which is the target of the determination process; and
(3) the object indicating the result of the determination process with a name of the scenario component data (for example, ID) in the sub-object space that is different from the main object space in which the scenario component data is arranged.

Variation Example 3

In the above embodiment, the databases is provided in the service providing server 30, and the databases are managed and controlled only in the service providing server 30, but each DB may be managed and controlled by a separate computer system.

Variation Example 4

In the above embodiment, the service providing server 30 provides various services and scenario generation and editing process to the user terminal device 10, but it is possible to construct a server system by interlocking multiple servers and execute various services and scenario generation and editing processing using the constructed server system.

Variation Example 5

In the above embodiment, the service control section 210 and the scenario generation and editing control section 220 are installed in the service providing server 30, but the scenario generation and editing control section 220 may be realized by a server that is provided independently.

REFERENCE SIGNS LIST

1 Information processing system
10 User's terminal device
20 Network
30 Service providing server
200 Data processing section
210 Service control section
211 Input reception section
212 Input analysis section
213 Response control section
220 Scenario generation and editing control section
221 Operation reception section
222 Generation and editing process section
223 Determination process section
224 Display control section
310 Communication control section
320 ROM/RAM
330 Data storage
331 Application DB
332 Scenario DB
340 Management control section
370 Display section
380 Drawing control section
390 Operation section

What is claimed is:

1. An interactive service providing system that performs a service desired by a user based on scenario data that is a digitized scenario and that defines responses corresponding to a given input text by analyzing the input text, the system comprising a processor programmed to:
receive instructions from an administrator who manages the scenario data;
generate or edit the scenario data by combining scenario component data that defines a predetermined script to configure the scenario data based on the received administrator's instructions;
perform, when generating or editing the scenario data, based on the accepted administrator's instructions (A) arranging a plurality of the scenario component data in an object space as objects, and (B) controlling connection and disconnection of two or more scenario component data arranged in the object space;
perform, when the two or more of the scenario component data are connected in the object space, a determination process that determines whether the group of scenario component data works properly or fails to work properly as at least a part of the scenario, the group of scenario component data having the two or more of the scenario component data; and
execute a display control process imaging the object space including the arranged scenario component data on a display, and displaying the result of the determination process on the display.

2. The interactive service providing system according to claim 1, wherein
the processor is programmed to perform, when the group of the scenario component data is arranged in the object space and is directly connected, the determination process that determines whether the group of scenario component data works properly or fails to work properly as at least a part of the scenario.

3. The interactive service providing system according to claim 1, wherein, the two or more scenario component data includes a first scenario component data and a second scenario component data, the first scenario component data being set earlier on a time-series basis to execute a scenario than the second scenario component data that is different from the first scenario component data and that is arranged after the first scenario component data on the time-series basis.

4. The interactive service providing system according to claim 1, wherein
the processor is programmed to display, when the two or more scenario component data fails to work properly the determination process, the result of the determination process as the object, in association with the corresponding scenario component data as the display control process.

5. The interactive service providing system according to claim 4, wherein
the processor is programmed to display an object of the result of the determination process on a connecting object that is for connecting between the corresponding plurality of scenario component data.

6. The interactive service providing system according to claim 1, wherein
the processor is programmed to hide a connecting object that is for connecting from the specified scenario component data to a next scenario component data, as the display control process.

7. The interactive service providing system according to claim 6, wherein
when the specified scenario component data has a plurality of options of which one is selected by the user, as the display control process, the processor is programmed to:
detect the number of the options of the specific scenario component data, the options being for connecting a next scenario component data that is available to be connected from the specific scenario component data; and
permit to display as many connection objects as there are the detected number of the options of the specific scenario component data, based on the administrator's instructions.

8. The interactive service providing system according to claim 1, wherein
the processor is programmed to:
seta predetermined configurable item of the scenario component data arranged in the object space based on the administrator's instruction; and
perform the determination process that determines whether the scenario component data having the set configurable item works properly or fails to work properly as the part of the scenario.

9. An interactive service providing method that performs a service desired by a user based on scenario data that is a digitized scenario and that defines responses corresponding to a given input text by analyzing the input text, comprising:
receiving instructions from an administrator who manages the scenario data;
generating or edits the scenario data by combining scenario component data that defines a predetermined script to configure the scenario data based on the received administrator's instructions;
when generating or editing the scenario data, based on the accepted administrator's instructions, (A) arranging a plurality of the scenario component data in an object space as objects, and (B) controlling connection and disconnection of two or more scenario component data arranged in the object space;
when the two or more of the scenario component data are connected in the object space, performing a determination process that determines whether the group of scenario component data works properly or fails to work properly as at least a part of the scenario, the group of scenario component data having the two or more of the scenario component data; and
executing a display control process imaging the object space including the arranged scenario component data on a display, and displaying the result of the determination process on the display.

10. A scenario generation and editing system that generates and edits scenario data that is used in an interactive service providing system that performs a service desired by a user based on scenario data that is a digitized scenario and that defines responses corresponding to a given input text by analyzing the input text, the system comprising a processor programmed to:
receive instructions from an administrator who manages the scenario data;
generate or edit the scenario data by combining scenario component data that defines a predetermined script to configure the scenario data based on the received administrator's instructions;
perform, when generating or editing the scenario data, based on the accepted administrator's instructions (A) arranging a plurality of the scenario component data in an object space as objects, and (B) controlling connection and disconnection of two or more scenario component data arranged in the object space;
perform, when the two or more of the scenario component data are connected in the object space, a determination process that determines whether the group of scenario component data works properly or fails to work properly as at least a part of the scenario, the group of scenario component data having the two or more of the scenario component data; and
execute a display control process imaging the object space including the arranged scenario component data on a display, and displaying the result of the determination process on the display.

11. A scenario generation and editing method that performs a service desired by a user based on scenario data that is a digitized scenario and that defines responses corresponding to a given input text by analyzing the input text, comprising:
receiving instructions from an administrator who manages the scenario data;
generating or edits the scenario data by combining scenario component data that defines a predetermined script to configure the scenario data based on the received administrator's instructions;
when generating or editing the scenario data, based on the accepted administrator's instructions, (A) arranging a plurality of the scenario component data in an object space as objects, and (B) controlling connection and disconnection of two or more scenario component data arranged in the object space;
when the two or more of the scenario component data are connected in the object space, performing a determination process that determines whether the group of scenario component data works properly or fails to work properly as at least a part of the scenario, the group of scenario component data having the two or more of the scenario component data; and executing a display control process imaging the object space including the arranged scenario component data on a display, and displaying the result of the determination process on the display.

* * * * *